United States Patent Office 3,515,774
Patented June 2, 1970

3,515,774
PROCESS FOR THE PRODUCTION
OF POLYBLENDS
Yoon Chai Lee, Springfield, Mass., assignor to Monsanto
Company, St. Louis, Mo., a corporation of Delaware
No Drawing. Filed June 26, 1967, Ser. No. 648,981
Int. Cl. C08f 19/08
U.S. Cl. 260—880                                10 Claims

ABSTRACT OF THE DISCLOSURE

There is disclosed a process for producing improved polyblends wherein a polymerizable formulation consisting essentially of a monovinylidene aromatic hydrocarbon is admixed with rubber and polymerization to at least the point of phase inversion is conducted en masse. A small amount of an unsaturated nitrile monomer is added to the partially polymerized mixture and polymerization is then conducted in suspension. The result is a graft polyblend in which the predominant portion of the unsaturated nitrile appears in the graft superstrate.

BACKGROUND OF THE INVENTION

As is well known, polyblends of rubber with monovinylidene aromatic hydrocarbons have significant advantages in providing compositions of desirable resistance to impact for many applications. Various processes have been suggested or utilized for the manufacture of such polyblends including emulsion, suspension and mass polymerization techniques, and combinations thereof. Although graft blends of a monovinylidene aromatic hydrocarbon and rubber prepared en masse exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of completion after phase inversion takes place. As a result, techniques have been adopted wherein the initial polymerization is carried out en masse to a point of conversion beyond phase inversion at which the viscosity levels are still of practical magnitudes, after which the resulting prepolymerization syrup is suspended in water or other inert liquid and polymerization of the monomers carried to substantial completion.

Although impact styrenes wherein a styrene monomer comprises the grafted monomer are widely employed, oftentimes interpolymers of styrene-type monomers with unsaturated nitriles are preferred for chemical resistance but at greater cost. Addition of the nitrile monomer during mass polymerization rapidly increases the viscosity of the polymerizing mixture, and generally a considerable percentage of the nitrile is utilized to provide an interpolymer containing 20 to 40 percent thereof.

Accordingly, it is an object of the present invention to provide novel polyblends comprising a monovinylidene aromatic hydrocarbon polymer and a rubber which exhibit highly advantageous physical and chemical properties at relatively low cost.

It is also an object of the invention to provide such polyblends which are highly compatible with nitrile polymers and which may be produced economically in existing mass-suspension polymerization equipment.

Another object is to provide a process for the production of such polyblends which permits inclusion of the predominant portion of relatively small amounts of an unsaturated nitrile monomer in the graft superstrate.

SUMMARY OF THE INVENTION

It has been found that the foregoing and related objects can be readily attained in a mass/suspension type of process wherein a rubbery polymer is dissolved in a polymerizable monomer formulation consisting essentially of monovinylidene aromatic hydrocarbon to form a polymerizable mixture, which is then subjected to polymerization en masse to polymerize a portion of the polymerizable formulation past the point of phase inversion to form a partially polymerized mixture. The partially polymerized mixture is suspended in an inert liquid and the suspension subjected to polymerization conditions to effect further polymerization. The present invention comprises the improvement in such a process wherein there is admixed with the partially polymerized mixture from about 1 to 8 percent, based upon the weight of said partially polymerized mixture, of an unsaturated nitrile seletced from the group consisting of acrylonitrile, methacrylonitrile, ethacrylonitrile, propacrylonitrile, butacrylonitrile and mixtures of such nitriles.

The point at which the nitrile monomer is introduced into the partially polymerized mixture is critical to the present invention since it is necessary that phase inversion have occurred. In addition, it is most desirable that there be no significant degree of polymerization of the nitrile monomer prior to the time that the partially polymerized mixture is suspended in the inert liquid because even a small amount of nitrile monomer in the polymerization mixture prior to the point at which polymerization en mass is substantially completed will increase the viscosity of the mixture significantly.

It should be pointed out that the viscosity factor also is closely related to the amount of rubber contained in the polymerization mixture and the degree of crystallinity thereof. If a very small amount of rubber is present, the problems of viscosity are much less acute. However, one of the most significant benefits of the technique described herein is that it allows the production of high rubber-content polyblends containing on the order of about 18 percent and more rubber. It is considered undesirable to reduce the concentration of rubber in the polyblends just to reduce viscosity to a point at which early nitrile introduction becomes feasible because reactors are then not used to maximum efficiency.

Although it is possible to introduce the nitrile monomer into the mass polymerization vessel after phase inversion and to terminate the polymerization therein prior to the point at which the viscosity becomes undesirably high, other complications may be encountered and the benefits of the mass polymerization step are largely reduced.

However, the nitrile monomer can be added without difficulty to the partially polymerized mixture while it is still in the mass polymerization vessel since it is only only necessary that no substantial amount of polymerization occur in that vessel after the nitrile monomer has been added. Thus, although addition may be made just prior to transfer of the prepolymer syrup to the suspension polymerization kettle, the preferred technique is to add the nitrile monomer directly to the inert liquid in the suspension kettle. Normally, water will be used as the inert liquid; since the nitrile monomers, such as acrylonitrile, are somewhat soluble in water, it is much more convenient to effect the addition in the preferred manner described.

It has been found that the presence of nitrile monomer in the polymerization mixture during mass polymerization tends to promote the formation of ungrafted interpolymer at the expense of grafting on the rubber backbone to provide an interpolymer in the superstrate. By the process of the present invention, the predominant portion (and generally about 70 percent or more) of the nitrile monomer will appear in the superstrate of the graft copolymer for optimum benefit.

POLYMERIZABLE MONOMER FORMULATION

In addition to the monomers to be polymerized, the formulation will contain catalyst where required and other desirable components such as stabilizers, molecular weight regulators, etc. The polymerizable monomer formulation consists essentially of one or more monovinylidene aromatic hydrocarbon monomers and may, in addition, include minor amounts, i.e., up to 20 percent, of a monomer copolymerizable therewith. The preferred compositions are those in which the polymerizable monomer formulation consists substantially entirely of monovinylidene aromatic hydrocarbons and most desirably styrene, although minor amounts of less than about 5 percent by weight of the copolymerizable monomers may be included to some advantage for particular compositions.

Exemplary of the monovinylidene aromatic monomers are styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of the monomers that can be employed or interpolymerized with monovinylidene aromatic monomers are alpha- or beta-unsaturated monobasic acids and derivatives thereof, e.g., acrylic acid, methyl acrylate, ethyl acrylate, butyl acrylate, 2-ethylhexyl acrylate, long chain ($C_{12-18}$) fatty acid acrylates, methacrylic acid and the coresponding esters thereof, e.g., methyl methacrylate, stearyl methacrylate; acrylamide, methacrylamide; vinyl esters; dialkyl maleates or fumarates such as dimethyl maleate, diethyl maleate, dibutyl maleate, the corresponding fumarates, etc. The preferred polymerizable monomer formulations contain at least 10.0 percent by weight of monovinylidene aromatic monomer and preferably at least 50.0 percent by weight thereof.

Any free radical generating catalyst may be used in the practice of this invention including actinic radiation. It is preferable to incorporate a suitable catalyst system for polymerizing the monomer such as the conventional monomer-soluble peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy) hexane, 2,5 - dimethyl-2,5-di(tert-butylperoxy)hexyne-3, tert-butyl hydroperoxide, cumene hydroperoxide, p-menthane hydroperoxide, cyclopentane hydroperoxide, pinane hydroperoxide, 2,5 - dimethylhexane-2,5-dihydroperoxide, etc., and mixtures thereof.

The catalyst is generally included within the range of 0.001 to 3.0 percent by weight, and preferably on the order of 0.005 to 1.0 percent by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols, although these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers, and mixtures thereof, as well as interpolymers thereof with each other or other copolymerizable monomers.

The preferred substrates, however, are diene rubbers (including mixtures with diene rubbers), i.e., any rubbery polymer (a polymer having a second order transition temperature not higher than 0° centigrade, preferably not higher than $-20°$ centigrade, as determined by ASTM Test D–746–52T) of one or more of the conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinylidene aromatic hydrocarbons (e.g. styrene; an aralkyl-styrene, such as the o-, m- and p-methylstyrenes, 2,4-dimethylstyrene, the arethylstyrenes, p-tert-butylstyrene, etc.; an alpha-methylstyrene, alphaethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl - 4 - chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g., vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g., the vinyl and vinylidene chlorides and vinylidene chlorides and bromides, etc.); and the like.

Although the rubber may contain up to about 2.0 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g. styrene), and unsaturated nitriles (e.g. acrylonitrile), or mixtures thereof. Particularly advantageous substrates are butadiene homopolymer or interpolymer of 90.0 to 95.0 percent by weight butadiene and 5.0 to 10.0 percent by weight of acrylonitrile or styrene.

THE POLYMERIZATION PROCESS

Based upon the combined weights of polymerizable monomer formulation and the rubber substrate, the amount of rubber employed will generally range between about 5 and 25 percent, the quantity of monomers correspondingly ranging between about 95 and 75 percent. In the preferred polymerization mixtures, the foregoing amounts will range between about 12 and 18 percent and 88 and 82 percent, respectively.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 50 to 200:100 and most desirably about 70 to 150:100. With graft ratios above 50:100, a highly desirable degree of improvement in various properties generally is obtained.

The rubbery polymer or substrate is dissolved in the polymerizable formulation which will consist of monomers, catalyst and other optional components. This polymerization mixture is then polymerized en masse by heating at a temperature of about 75 to 125° centigrade over a period of about one to forty-eight hours and at a pressure of 1 to 100 pounds per square inch until a portion of the monomer has been polymerized at least sufficient to produce phase inversion, generally about 15.0 to 50.0 by weight thereof, with conventional stirring to aid heat transfer during reaction. The time for this partial polymerization will vary depending upon the catalyst, pressures and temperatures employed and the particular monomers and ratios thereof. Generally, it is preferred to conduct such a prepolymerization process to convert approximately 20.0 to 35.0 percent by weight of the monomer.

After the prepolymer is prepared, the critical step is carried out, i.e., admixing with the prepolymer syrup (partially polymerized mixture) an unsaturated nitrile monomer selected from the group consisting of acrylonitrile, methacrylonitrile, ethacrylonitrile, propacrylonitrile, butacrylonitrile and mixtures of such nitriles. As was mentioned previously, the nitrile monomer can be initially added either to the suspension kettle or to the mass polymerization mixture. In the latter case, however, introduction should be delayed until the prepolymerization step is substantially completed, and just prior to suspension thereof to minimize additional polymerization in the mass polymerization vessel.

The amount of nitrile monomer, or combination thereof, introduced will be about 1.0 to 8.0 percent based upon the weight of the prepolymer syrup. Less than about 1.0 percent of nitrile monomer is usually of little benefit whereas adding a quantity of nitrile monomer in excess of about 8.0 percent is generally undesirable because above that level incompatibility may be encountered. The preferred range of amounts of nitrile monomer added is about 4.0 to 6.0 percent by weight of the prepolymer syrup.

Either before or after introduction of the nitrile monomer, the syrup provided by the partially polymerized formulation is admixed with water in the presence of a suspending agent such as the acrylic acid-acrylate interpolymers of U.S. Pat. No. 2,945,013, granted July 12, 1960, and U.S. Pat. No. 3,051,682, granted Aug. 28, 1962. Secondary dispersing aids may also be added to obtain the desired suspension of the syrup in water. The suspending agent is desirably added to the water, although it may be added to the monomers ab initio or during initial polymerization. This suspension is subjected to agitation and heated at a temperature of about 75 to 200° centigrade for a period of one to forty-eight hours to obtain substantially complete polymerization of the monomers therein. Preferably, such further polymerization is carried out at a temperature of about 100 to 170° centigrade for a period of one to twenty hours, depending upon the catalyst and the amount thereof employed. After completion of the reaction, the polymer beads are recovered by centrifuging, washed and dried.

DESCRIPTION OF THE PREFERRED EMBODIMENTS

Illustrative of the efficacy of the present invention are the following specific examples wherein all parts and percentages are by weight unless otherwise specified.

Example 1

A polymerization mixture comprising about 16 percent of butadiene rubber dissolved in about 84 percent of styrene monomer is charged to a suitable reaction vessel. After adding about 0.1 percent of di-tert-butyl peroxide catalyst and about 0.04 percent of a tert-dodecyl mercaptan chain transfer agent, the reaction vessel is purged of oxygen by a stream of nitrogen and the polymerization mixture stirred and heated under reflux conditions to effect heat transfer and polymerize about 30 percetn of the styrene monomer.

The resulting partially polymerized syrup is then suspended in heated water having suitable suspending agents dispersed therein, and a relatively small quantity of acrylonitrile monomer is added (between about 1 and 8 percent based upon the weight of prepolymer syrup, as indicated in the following table). The suspension is thereafter heated and stirred to effect heat transfer and maintain the suspension for a period of time sufficient to effect substantially complete conversion of the monomer to polymer. Finally, the suspension is cooled, centrifuged, washed and dried to recover the polyblend particles.

The properties of specimens molded from the polyblends which are produced by the several different amounts of nitrile additions are set forth in Table 1. Also presented are data obtained from a specimen prepared in a similar manner, but in the preparation of which no acrylonitrile monomer is added.

TABLE 1

| Blend No. | Parts of AN | Tensile strength (lb./in.²) | | Percent elongation at fail | Chemical resistance (hours) [1] |
|---|---|---|---|---|---|
| | | Yield | Fail | | |
| 1 | 0 | 1,956 | 2,567 | 80 | 3 |
| 2 | 1.0 | 2,115 | 2,921 | 75 | 5.5 |
| 3 | 2.0 | 2,572 | 3,096 | 87 | 4 |
| 4 | 3.0 | 1,954 | 3,120 | 112 | 7 |
| 5 | 4.0 | 2,710 | 3,791 | 120 | 11 |
| 6 | 5.0 | 2,351 | 3,685 | 114 | 10 |
| 7 | 6.0 | 2,610 | 3,430 | 114 | 11.5 |
| 8 | 8.0 | 2,177 | 3,433 | 81.8 | 12 |

[1] In the chemical resistance test, tensile bars having a cross-section at the narrowest point of 0.25 x 0.03 inch were placed in an aggressive environment and subjected to a constant stress of 1000 p.s.i. The time in hours required for fracture was noted as a measure of chemical resistance of the specimens. The aggressive environment comprised lard spread on the tensile bars which were maintained at a constant temperature of 72° Fahrenheit.

It is seen from the foregoing data that in every instance samples which are molded from the polyblends of the present invention exhibit improved levels of chemical resistance, as compared to the chemical resistance of the control specimen to which no acrylonitrile is added after the prepolymerization step. Each blend also produces a sample which is of superior tensile strength at points of both yield and failure, with the sole exception of the tensile yield of blend No. 4. Furthermore, each sample, excepting only sample 2 (which contains the smallest amount of acrylonitrile), shows a higher percentage of elongation at fail than the control. Accordingly, it can be seen that the present process provides improved chemical and physical properties.

Example 2

A polyblend corresponding to Blend No. 4 of Example 1 is analyzed to determine the graft ratio, and it is found that over 90 percent of the acrylonitrile added is combined in the graft superstrate.

For comparison, a similar blend is prepared by adding the nitrile at the beginning of mass polymerization rather than in the suspension vessel. The resulting product is found to be much less efficiently grafted, having only 50–60 percent of the acrylonitrile in the graft superstrate.

Example 3

Blends are prepared by combining the styrene/butadiene polyblends of the present invention with about 10 percent, based upon the weight of the blend produced, of poly(acrylonitrile). Similar blends are also prepared using comparable styrene/butadiene polyblends, prepared without the addition of any nitrile monomer to the polymerizable mixture. The former blends are found to be much more compatible than the latter and also to possess much improved properties.

Thus, it can be seen that the process of this invention provides products having improved chemical and physical properties as well as higher levels of compatibility with nitrile polymers. It also provides high levels of grafting efficiency and greater control over polymerization. The process is convenient and introduces substantially no complexities into the normal mass-suspension polymerization techniques.

What is claimed is:

1. In a process for preparing a polyblend composition of the type wherein a composition consisting essentially of a graftable rubbery polymer is dissolved in a polymerizable formulation consisting essentially of at least one monovinylidene aromatic hydrocarbon to form a polymerizable mixture, the polymerizable mixture is subjected to polymerization en masse to polymerize a portion of the polymerizable formulation to form a partially polymerized mixture and at least to the point where phase inversion of the polymerizable mixture takes place, the partially polymerized mixture is suspended in an inert liquid, and the suspension is subjected to polymerization conditions to effect further polymerization; the improvement which comprises admixing with the partially polymerized mixture after phase inversion thereof from about 1.0 to 8.0 percent, based upon the weight of said partially polymerized mixture, of an unsaturated nitrile selected from the group consisting of acrylonitrile, methacrylonitrile, ethacrylonitrile, propacrylonitrile, butacrylonitrile and mixtures of such nitriles, and wherein no substantial polymerization occurs en masse subsequent to addition of said unsaturated nitrile.

2. The process of claim 1 wherein said unsaturated nitrile is added to said inert liquid.

3. The process of claim 1 wherein from about 14.0 to 18.0 percent of rubbery polymer is dissolved in from about 86.0 to 82.0 percent of polymerizable monomer formulation based upon the combined weights thereof, to form said polymerizable mixture, and wherein said nitrile is added in an amount of about 4.0 to 6.0 percent of said mixtures.

4. The process of claim 1 wherein said polymerizable monomer formulations consists substantially entirely of a monovinylidene aromatic hydrocarbon.

5. The process of claim 1 wherein said polymerizable monomer formulations consists substantially entirely of styrene monomer, wherein said rubbery polymer is a diene rubber, and wherein said nitrile is acrylonitrile.

6. A polyblend consisting essentially of (A) a matrix of a polymer consisting essentially of a monovinylidene aromatic hydrocarbon and (B) a graft copolymer having a graftable rubbery polymer substrate and a superstrate of molecules of an interpolymer consisting essentially of monovinylidene aromatic hydrocarbon and an unsaturated nitrile, said nitrile comprising about 0.8 to 8.0 percent by weight of said graft copolymer, said superstrate also containing molecules of monovinylidene aromatic hydrocarbon polymer which are free from unsaturated nitrile, said graft copolymer having been produced by the process of claim 1.

7. The polyblend of claim 6 wherein said monovinylidene aromatic hydrocarbon is styrene.

8. The polyblend of claim 6 wherein said unsaturated nitrile is acrylonitrile.

9. The polyblend of claim 6 wherein said monovinylidene aromatic hydrocarbon is styrene, said unsaturated nitrile is acrylonitrile, and said rubbery polymer is a diene polymer.

10. The polyblend of claim 6 wherein said polyblend additionally contains in the matrix a polymer of an unsaturated nitrile.

References Cited

UNITED STATES PATENTS 3,288,886  11/1966  Himei et al. _____ 260—880
3,324,066  6/1967   Argangeli et al. _____ 260—880

FOREIGN PATENTS 965,851  8/1964  Great Britain.

MURRAY TILLMAN, Primary Examiner

M. J. TULLY, Assistant Examiner

U.S. Cl. X.R.

260—4, 878, 876